March 31, 1959 M. G. KROGER 2,880,271
TELEVISION RECEIVER
Filed Oct. 1. 1953
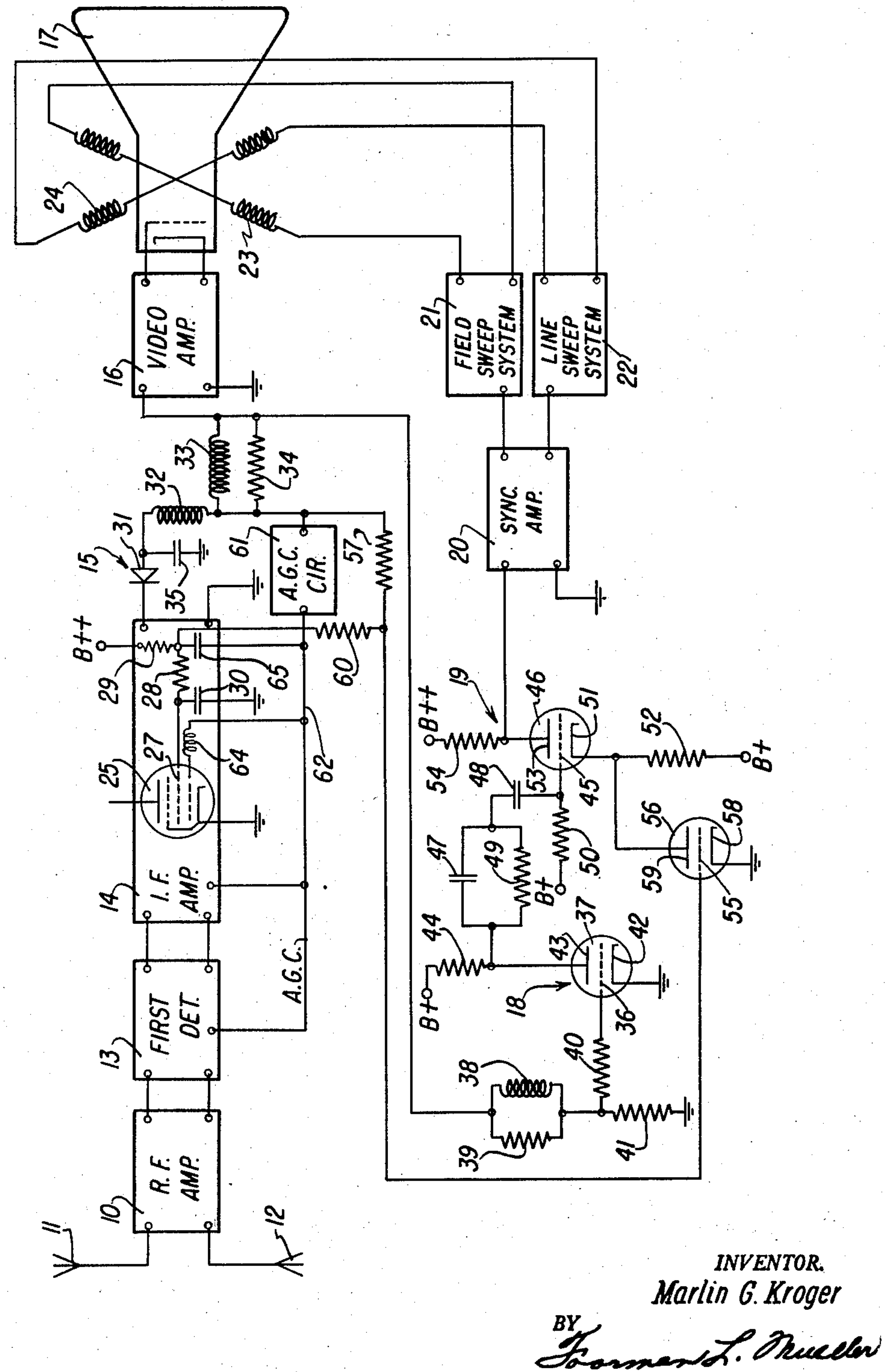
INVENTOR.
Marlin G. Kroger
BY Norman L. Mueller
Atty.

United States Patent Office 2,880,271

Patented Mar. 31, 1959

2,880,271

TELEVISION RECEIVER

Marlin G. Kroger, Oak Park, Ill., assignor to Motorola, Inc., Chicago, Ill., a corporation of Illinois Application October 1, 1953, Serial No. 383,679

5 Claims. (Cl. 178—7.3)

This invention relates to television receivers and more particularly to a television receiver including an improved synchronizing signal separating circuit for separating the line and field synchronizing components of a received television signal from the remainder of the signal.

In accordance with current television broadcasting standards in the United States, the composite television signal which is amplitude modulated upon a picture carrier wave comprises a series of relatively narrow line synchronizing pulses recurring at the end of each scanning line and a series of relatively wide field synchronizing pulses recurring at the end of each complete picture field. The line and field synchronizing pulses all have the same amplitude with respect to a unidirectional reference potential level corresponding to zero carrier amplitude and this amplitude is greater than the maximum amplitude of any of the interspersed picture or video components.

The line and field synchronizing pulses are separated from the remainder of the television signal in the television receiver and utilized to synchronize the horizontal and vertical scanning wave generators as is well known. It is common practice to separate these synchronizing pulses by means of a peak detector circuit which effectively clips off all the portions of the composite signal below the synchronizing pulse level and which normally passes only the synchronizing pulses. Such a circuit is satisfactory so long as only the received synchronizing pulses extend above the clipping level. However, unwanted noise bursts are also very often received in conjunction with the television signal and these bursts, in many instances, have sufficient amplitude or energy content to affect adversely the operation of the peak detector. When these noise bursts have sufficient amplitude or a sufficiently high repetition rate, they charge up an ordinary peak detector circuit to a point where it is paralyzed and does not pass the synchronizing pulses and this results in a loss of synchronization in the reproduced television picture for the duration of such paralysis.

It is, accordingly, an object of the present invention to provide a synchronizing signal separating circuit which is effective to pass the synchronizing components of the received television signal, but which is relatively unresponsive to interfering noise bursts or pulses even of greater amplitude or energy content than the synchronizing pulses.

Another object of the invention is to provide such an improved synchronizing signal separating circuit which is effective to pass the synchronizing components of any one of a pluarity of received television signals of varying intensities and which is relatively unresponsive to interfering noise bursts and not subject to paralysis thereby.

A further object of the invention is to provide such an improved television synchronizing signal separating circuit that requires relatively simple and inexpensive circuit components yet which is unaffected to any appreciable extent by interfering noise bursts.

A feature of the invention is the provision of a television receiver which incorporates a synchronizing signal separating circuit with a control network coupled thereto for disabling the synchronizing circuit in response to signals having a peak amplitude above an established threshold, and which also includes means for developing a uni-directional potential varying in accordance with the intensities of the television signals utilized by the receiver for establishing the threshold in the control network. The detected television signals in the receiver are impressed on the control network and the arrangement is such that the noise bursts cause the control network to disable the separating network for the duration of such bursts, the threshold being controlled so that any bursts having a greater amplitude than the synchronizing pulses causes it to disable the separating circuit regardless of the intensity of the particular television signal being utilized by the receiver.

The above and other features of the invention which are believed to be new are set forth with particularity in the appended claims. The invention itself, however, together with further objects and advantages thereof, may best be understood by reference to the following description when taken in conjunction with the accompanying drawing in which: the single figure shows a television receiver constructed to incorporate the invention.

The television receiver of the invention is constructed to utilize television signals of different intensities and comprises means for selecting any desired one of the television signals and an amplifier for amplifying the selected television signal. A detector is coupled to the amplifier for demodulating the selected television signal to produce a composite video signal including video, synchronizing and unwanted noise components. An automatic gain control circuit is included in the receiver and controls the gain of the amplifier in accordance with the intensity of the selected television signal. A synchronizing signal separator circuit is provided and means including a self-biasing network is coupled to the detector for supplying the composite video signal to the separator circuit with the synchronizing and noise components thereof extending in a positive direction. The control network is coupled to the separator circuit for disabling the separator circuit in response to signals having a peak amplitude extending above a threshold established in the control network. A network is included in the amplifier for producing a uni-directional potential varying with respect to the intensity of the television signals translated by the amplifier, and means is coupled to this network for supplying the uni-directional potential to the control network to establish the threshold of the control network at a level determined by the intensity of the particular television signal utilized by the receiver. Finally, means is provided for supplying the composite video signal to the control network to cause the control network to disable the separator circuit for the duration of each of the noise components of the composite video signal having a peak amplitude extending above the established threshold of the control network.

The receiver of Figure 1 includes a radio frequency amplifier 10 having any desired number of stages, the amplifier having input terminals connected to an antenna circuit 11—12, and output terminals connected to a first detector 13. Detector 13 is coupled to an intermediate frequency amplifier 14 of any desired number of stages and amplifier 14 is connected to a second detector which is designated generally as 15. Second detector 15 is coupled through a video amplifier 16 of one or more stages to the input electrodes of a cathode ray image reproducing device 17.

Detector 15 is also connected in a manner to be described to a synchronizing signal amplifier designated 18 which, in turn, is connected to a synchronizing signal separator designated 19. Separator circuit 19 is connected to a second synchronizing signal amplifier 20 and amplifier 20 is connected to a field sweep system 21 and to a line sweep system 22. Sweep systems 21 and 22 are connected respectively to the field deflection elements 23 and line deflection elements 24 of cathode ray image reproducing device 17. The sound portion of the television receiver forms no part of the present invention and for that reason has not been shown. In so far as the operation of the television receiver described thus far is concerned, any one of a number of television signals having varying intensities, which are intercepted by antenna circuit 11, 12, may be selected and amplified by radio frequency amplifier 10. The amplified selected television signal from the radio frequency amplifier is heterodyned to the selected intermediate frequency of the receiver in first detector 13 and the resulting intermediate frequency signal is amplified in intermediate frequency amplifier 14. The amplified intermediate frequency signal is detected in second detector 15 which produces a composite video signal of negative polarity with line and field synchronizing components and unwanted noise components extending in a negative direction. The composite video signal is amplified in video amplifier 16, and the signal is supplied to the input electrodes of cathode ray image reproducing tube 17 to modulate the intensity of the cathode ray beam therein in accordance with the video intelligence in a manner well understood in the art.

The composite video signal from detector 15 is also amplified in synchronizing signal amplifier 18. The amplified signal from amplifier 18 is supplied to synchronizing signal separator 19 which removes the line and field synchronizing components from the remainder of the composite video signal. The synchronizing components may be further amplified if so desired by the provision of a synchronizing signal amplifier 20, and these components are then applied to sweep systems 21 and 22 to synchronize these systems and the line and field sweeps of reproducing device 17 with the incoming television signal. In this manner, image reproducing device 17 is enabled to synthesize an image corresponding to the picture information of the received television signals.

One of the stages of intermediate frequency amplifier 14 includes an electron discharge device 25 of the pentode type having an anode, a cathode, a control electrode, a screen electrode, and a suppressor electrode. This device is connected in well known manner as one of the amplifier stages in the intermediate frequency amplifier and it is believed unnecessary to show in detail the known connections of this amplifier. For this reason and to simplify the description of the invention, only that portion of the circuit is shown that is necessary for a clear understanding of the invention. The screen electrode 27 of discharge device 25 is connected to the positive terminal B++ through a pair of series-connected resistors 28 and 29 and is bypassed to ground for the intermediate frequency by a capacitor 30.

Second detector 15 includes a rectifying diode discharge device 31 which is coupled to the output circuit of the intermediate frequency amplifier 14 in well known manner. Diode 31 is also coupled to the input circuit of video amplifier 16 through a pair of peaking coils 32 and 33, the latter coil being shunted by a damping resistor 34. The junction of diode 31 and coil 32 is coupled to ground through an intermediate frequency bypassing capacitor 35. The junction of peaking coil 33 and the input terminal of video amplifier 16 is connected to the control electrode 36 of an electron discharge device 37 included in synchronizing signal amplifier 18. The latter connection is made through a peaking coil 38 shunted by a damping resistor 39 and through a series-connected limiting resistor 40, the junction of resistors 39 and 40 being connected to a reference potential point or ground through a grid-leak resistor 41. The cathode 42 of device 37 is directly connected to ground and the anode 43 of this device is connected through a load resistor 44 to the positive terminal B+ of a first source of uni-directional potential.

Anode 43 is coupled to the control electrode 45 of an electron discharge device 46 included in synchronizing signal separator 19. The latter coupling is made through a self-biasing network comprising a pair of series-connected capacitors 47 and 48, capacitor 47 being shunted by a resistor 49. Control electrode 45 is returned to the positive terminal B+ through a grid-leak resistor 50. The cathode 51 of discharge device 46 is connected to the positive terminal B+ through a cathode resistor 52, and the anode 53 of device 46 is connected through a load resistor 54 to the positive terminal B++ of a second uni-directional potential source higher than the first mentioned source. Anode 53 is further connected to one of the input terminals of synchronizing signal amplifier 20 which, in conjunction with the sweep systems and the deflection elements of reproducing device 17, constitutes a utilization circuit for the synchronizing signal separator 19. The junction of peaking coils 32 and 33 is connected to the control electrode 55 of an electron discharge device 56 through a resistor 57. The cathode 58 of device 56 is directly connected to ground and the anode 59 of this device is connected to the cathode 51 of discharge device 46. Positive bias for control electrode 55 is provided from the junction of resistors 28 and 29 connected to the screen electrode 27 of device 25, this junction being connected to control electrode 55 of device 56 through a resistor 60.

An automatic gain control circuit 61 of any well known construction is connected to the junction of peaking coils 32 and 33 and to an automatic gain control lead 62 which, in turn, is connected to the various stages of the receiver for automatic gain control purposes. In so far as the intermediate frequency amplifier discharge device 25 is concerned, the connection from AGC lead 62 is made to the control electrode 63 of this device through an inductance coil 64 in well known manner, and the junction of resistor 28 and 29 is coupled to the AGC lead 62 through a capacitor 65.

The connection of discharge devices 37 and 46 is somewhat similar to the circuit disclosed and claimed in copending application, Serial No. 343,032, filed March 18, 1953, in the name of Garth J. Heisig et al., entitled "Television Receiver" and assigned to the present assignee.

The negative polarity composite video signal from second detector 15, which includes negative-going line and field synchronizing components and which also includes negative-going bursts of undesired noise having, in some instances, peaks exceeding the peaks of the synchronizing components, is supplied to the control electrode 36 of discharge device 37. This signal is amplified and inverted in phase and appears in the anode circuit of device 37 on a positive D.C. axis with the synchronizing components extending in the positive direction. The accompanying noise bursts are also amplified to some extent in device 37 but are amplitude limited thereby to have a peak amplitude approximating the peaks of the synchronizing components. The signal components in the anode circuit of device 37 are supplied to the control electrode 45 of device 46 through a self-biasing network including capacitors 47 and 48 and resistors 49 and 50. The self-biasing network biases device 46 so that the device normally translates only the line and field synchronizing pulses of the composite video signal regardless of the intensity of that signal. The high amplitude noise pulses tend to drive the control electrode 45 of the synchronizing signal separator device 46 positive producing an excessive charge on the coupling capacitor in the self-biasing network which, in turn, produces a negative bias of the device 46 causing it to be paralyzed and non-conductive to the synchronizing pulses until the excessive charge leaks off the coupling capacitors. This effect is reduced to some extent due to the limiting action on the noise bursts of device 37 and also by the disclosed self-biasing network which is of the known double time-constant type. During normal operation, capacitor 48 and resistor 50 constitute a relatively slow time-constant network and capacitor 48 has a relatively high charge thereon to provide the proper bias for device 46. Network 47, 49, however, has a relatively fast time-constant and capacitor 47 has a relatively low charge during normal operation of the receiver. When a high amplitude noise burst is impressed on the circuit, most of the charge resulting therefrom is assimilated by capacitor 47 and rapidly discharged through resistor 49 so that the paralysis due to such a burst is materially decreased. However, it has been found that even with the disclosed arrangement, the operation of the synchronizing signal separator is not entirely satisfactory in the presence of a relatively large amount of noise. The present invention is constructed to obviate this condition for all the various intensities of the television signals utilized by the receiver.

It is to be noted that synchronizing signal separator device 46 has its anode connected to a first reference potential point B++ and its cathode connected to a second reference potential point B+ negative with respect to the first point. Electron discharge device 56 has its cathode connected to ground or what may be termed a reference potential point with respect to B+. Detector 15 is directly connected to control electrode 55 of discharge device 56 and supplies the aforementioned negative polarity composite video signal thereto. At the same time, the circuit of the screen electrode 27 of discharge device 25 supplies a positive uni-directional potential to the control electrode 55 to bias the control electrode in a positive direction so that a desired threshold may be established. Since device 25 is controlled by the automatic gain control circuit 61, the current flowing in its screen electrode circuit varies with signal intensities so that the uni-directional potential developed at the junction of resistors 28 and 29 likewise varies with signal intensities. That is, for relatively high signal intensities, the potential at the junction of resistors 28 and 29 is relatively high due to the decreased current flow in the screen grid circuit of device 25 by the action of the AGC circuit; and for relatively low intensity television signals, the potential at the junction of resistors 28 and 29 is relatively low due to the AGC circuit. In this manner, a uni-directional potential is supplied to the control electrode 55 of device 56 which biases the control electrode positive and establishes a threshold for the device that varies in accordance with the intensities of the television signals utilized by the receiver.

Under normal operating conditions, the positive bias supplied to the control electrode 55 of device 56 from the junction of resistors 28 and 29 is sufficient to cause grid current to flow. This lowers the impedance between the control electrode 55 and ground to a low value which is of the order of a few hundred ohms and bypasses the video signal at the control electrode to ground so that substantially none of the video signal is amplified by the device and translated to its anode circuit. However, since device 56 is biased to draw grid current, it is fully conductive and draws substantial DC current through resistor 52, and this drives the cathode 51 of device 46 in a negative direction to a value substantially below B+ to bias device 46 to a conductive state. Under such normal conditions, the net bias of device 46 is determined by the self-biasing action of network 47–50 so that the device properly performs its synchronizing pulse clipping position. High amplitude noise pulses at the detector, however, overcome the positive bias on the control electrode 55 of device 56 and drive the control electrode in a negative direction and render device 56 non-conductive. The voltage on cathode 51 of device 46 therefore rises to B+ for the duration of each such noise pulses. Network 47–50 cannot readjust the bias on control electrode 45 immediately during these noise intervals because of the time-constant involved and device 46 is rendered non-conductive during each of these intervals. At the same intervals the amplitude limited noise pulses are impressed on control electrode 45 of device 46 with positive polarity, but due to the increased negative bias on the device, the control electrode does not draw grid current and no charge is experienced by capacitors 47 and 48 with the resulting adverse biasing action and paralysis. In the presence of noise, therefore, the synchronizing signal separator 19 is merely rendered inoperative so that synchronization is lost for a brief moment for the duration of each noise burst. However, the adverse effect of noise on the self-biasing network of the synchronizing separator is entirely removed and the resulting paralysis of the synchronizing signal separator is eliminated.

Should the control electrode 55 of device 56 be returned to a source of fixed positive biasing potential, it is evident that some manual adjustment need be provided so that this bias can be adjusted for the television signals of different intensities utilized by the receiver. This obtains because in the case of high intensity television signals, not only would the noise bursts included therein render the device 56 non-conductive, but unless the threshold of the device is properly adjusted, the peaks of the synchronizing pulses can also render device 56 non-conductive. This effect prevents synchronization of the receiver. On the other hand, in the presence of weak television signals, unless the threshold of device 56 is manually adjusted, only the exceedingly high noise bursts would render device 56 non-conductive so that separator 19 is liable to paralysis by the noise bursts of lesser amplitude. To obviate this condition, in accordance with the present invention, the control electrode 55 of device 56 is returned to a source of positive biasing potential that varies with the intensities of the television signals utilized by the receiver. In the presence of strong television signals, this biasing source is rendered more positive so that the threshold of device 56 is automatically adjusted so that the device is rendered non-conductive by the noise bursts but not by the synchronizing component. On the other hand, in the presence of a weak intensity television signal, the positive biasing potential of the source decreases so that the threshold of device 56 is automatically adjusted to enable all the noise bursts of that signal exceeding the synchronizing components in amplitude to render device 56 non-conductive for the reasons described previously herein.

To accomplish the above purposes, the control electrode 55 of device 56 is returned to the common junction of resistors 28, 29 in the screen electrode circuit of discharge device 25. As previously stated, discharge device 25 is controlled by the automatic gain control circuit 61 so that the current flow in its screen electrode circuit varies inversely with the intensity of the television signals utilized by the receiver. For relatively high intensity television signals, the AGC circuit increases the negative bias on device 25 to decrease its gain and this decreases the current flow of the screen grid 27 to establish the junction of resistors 28, 29 at a relatively high positive value thereby to establish the threshold of device 56 at a relatively high value. On the other hand, for low intensity television signals, the automatic gain control circuit 61 reduces the negative bias on device 25 to increase its gain and this increases the current flow in screen electrode 27 to reduce the positive potential at the junction of resistor 28 and 29, thereby to reduce the positive threshold of device 56.

Resistors 28, 29 and resistor 60 have parameters so that device 56 performs its intended function for all television signals utilized by the receiver under normal operating conditions. In a constructed embodiment of the invention, capacitor 30 was given a value of 470 micro-microfarads, resistors 28 a value of 470 ohms, resistor 29 a value of 39,000 ohms, capacitor 65 a value of .05 microfarad, resistor 60 a value of 820,000 ohms, and resistor 57 a value of 22,000 ohms.

When so desired, the anode circuit of device 25 may be used as a source of positive biasing potential for establishing a threshold for device 56. In the latter arrangement it is merely necessary to provide a well known decoupling network in the anode circuit to obtain a positive potential point that varies with variations in the automatic gain control.

The invention provides, therefore, an improved television receiver for utilizing television signals of different intensities and which is capable of efficient separation of the synchronizing components of such television signals even in the presence of noise bursts in such signals.

While a particular embodiment of the invention has been shown and described, modifications may be made and it is intended in the appended claims to cover all such modifications as fall within the true spirit and scope of the invention.

I claim:

1. A television receiver for utilizing television signals of different intensities including in combination, a discharge device circuit for translating a received television signal and including an output network; a detector for demodulating the received television signal to produce a composite video signal including video, synchronizing and noise components; an automatic gain control circuit responsive to the intensity of the received television signal for controlling said discharge device circuit and causing said output network to produce a unidirectional control potential related to the intensity of the received television signal; a synchronizing signal separator circuit including a discharge device having a control electrode; circuit means for supplying the composite video signal from said detector to said separator circuit with the synchronizing and noise components thereof extending in a positive direction; a biasing network for said separator discharge device included in said circuit means and including series capacitor means connected to said control electrode and discharge resistor means connected to said capacitor means; a control circuit for said separator discharge device including a normally conductive discharge device coupled to said separator discharge device for rendering the latter non-conductive when the former is driven beyond its cutoff point to its non-conductive state; circuit means for supplying the unidirectional potential from said output network to said control circuit discharge device with a polarity to cause increased conduction of said normally conductive discharge device with increase in the intensity of the received television signal; and a circuit for supplying the composite video signal from said detector to said control circuit to render said discharge device therein non-conductive for the duration of each of the noise components of said composite video signal having a peak amplitude extending above a certain threshold.

2. A television receiver for operation with television signals of different intensities including in combination; a detector for demodulating the received television signals to produce a composite video signal including synchronizing components and video components, and which may also include noise components; automatic gain control circuit means responsive to the intensity of the received television signal to provide a unidirectional control potential increasing in magnitude with increase in the intensity of the received television signal; a synchronizing signal translating circuit including a first electron discharge device; circuit means for applying the composite video signal from said detector to said first electron discharge device with a polarity tending to cause increased conduction thereof as the composite video signal increases; a control circuit including a second electron discharge device coupled to said detector and to said first electron discharge device for applying said noise components to said first electron discharge device with a polarity tending to reduce conduction thereof as said noise components increase; further circuit means coupled to said automatic gain control circuit means for applying a threshold potential to said second electron discharge device which is directly dependent upon the intensity of the received television signal and which is of a polarity for controlling conduction of said second electron discharge device oppositely to that caused by said noise components; whereby response of said first electron discharge device to said noise components is reduced in accordance with the intensity of the received television signal.

3. A television receiver for utilizing television signals of different intensities including in combination, a detector for demodulating the received television signal to produce a composite video signal including video and synchronizing components, and which may also include noise components; an automatic gain control circuit responsive to the received television signal for providing a unidirectional control potential related to the intensity of the received television signal; a synchronizing signal translating circuit including a first discharge device having a control electrode; first circuit means for supplying the composite video signal from said detector to said translating circuit with the synchronizing and noise components thereof extending in a positive direction and tending to cause increased conduction of said first discharge device with increase in the video signal level; a biasing network for said first discharge device included in said circuit means and including series capacitor means connected to said control electrode and discharge resistor means connected to said capacitor means; a control circuit for said first discharge device including a second discharge device; second circuit means coupling said detector to said second discharge device to apply said noise components thereto with given polarity; means coupling said second discharge device to said first discharge device to apply said noise components thereto with a polarity tending to cause decreased conduction thereof with increase in said noise component level; and circuit means responsive to the unidirectional potential from said automatic gain control circuit for supplying a threshold potential to said second discharge device varying in accordance with the intensity of the received television signal and of a polarity opposite to said given polarity so that response of said signal translating circuit to noise components is reduced with the intensity of the received television signal.

4. A television receiver for utilizing television signals of different intensities including in combination; a detector for demodulating the received television signals to produce a composite video signal including synchronizing components, and which may also include noise components; automatic gain control circuit means responsive to the intensity of the received television signal to provide a unidirectional control potential increasing in magnitude with increase in the intensity of the received television signal, a synchronizing signal translating circuit including electron discharge means having at least first and second input electrodes, first circuit means coupled to said detector and to said first input electrode for applying said noise components to said electron discharge means, second circuit means connected to said automatic gain control circuit means for applying to said electron discharge means a control potential increasing in magnitude with increase in the intensity of the received television signal, whereby modified noise components are provided in said electron discharge means having a level which increases with increase in the intensity of the received television signal, and third circuit means coupled to said detector and to said second input electrode for applying the composite video signal to said electron discharge means, said composite video signal and said modified noise components in said electron discharge means having polarities such that said modified noise components tend to cancel noise components included with said composite video signals with such cancelling action being varied according to the intensity of the received television signal.

5. A television receiver for utilizing television signals of different intensities including in combination; a detector for demodulating the received television signals to produce a composite video signal including synchronizing components, and which may also include noise components; automatic gain control circuit means responsive to the intensity of the received television signal to provide a unidirectional control potential increasing in magnitude with increase in the intensity of the received television signal; a synchronizing signal translating circuit including electron discharge means having at least first and second input electrodes, first circuit means coupled to said detector and to said first input electrode for applying said noise components to said electron discharge means, second circuit means including an electron discharge device connected to said automatic gain control circuit means for providing a positive control potential increasing in magnitude with increase in the intensity of the received television signal, said second circuit means applying said positive control potential to said electron discharge means to provide therein modified noise components the level of which is increased with increase in the intensity of the received television signal, and third circuit means coupled to said detector and to said second input electrode for applying the composite video signal to said electron discharge means, said third circuit means including a biasing network for said second input electrode including series capacitor means and discharge resistor means for said capacitor means, said composite video signal and said modified noise components in said electron discharge means having polarities such that said modified noise components tend to cancel noise components included with said composite video signals with such cancelling action being varied according to the intensity of the received television signal.

References Cited in the file of this patent

UNITED STATES PATENTS

| | | |
|---|---|---|
| 2,631,230 | Marsh | Mar. 10, 1953 |
| 2,651,675 | Wissel | Sept. 8, 1953 |
| 2,668,234 | Druz | Feb. 2, 1954 |
| 2,735,002 | Keizer et al. | Feb. 14, 1956 |
| 2,736,769 | Macovski | Feb. 28, 1956 |
| 2,791,627 | Thomas | May 7, 1957 |

OTHER REFERENCES

Rider's Television Manual, vol. 11, Westinghouse TV, pp. 11–14. (Copyrighted April 29, 1953.)

Capehart-Farnsworth TV, pp. 11–14.